United States Patent [19]
Ohmori et al.

[11] Patent Number: 4,871,820
[45] Date of Patent: Oct. 3, 1989

[54] ALPHA-FLUOROACRYLIC ACID POLYMER AND ITS USE

[75] Inventors: Akira Ohmori, Ibaraki; Takashi Yasuhara, Settsu, both of Japan

[73] Assignee: Daikin Industries, Ltd., Osaka, Japan

[21] Appl. No.: 152,296

[22] Filed: Feb. 4, 1988

[30] Foreign Application Priority Data

Feb. 17, 1987 [JP] Japan ................................ 62-35401

[51] Int. Cl.$^4$ ............................................. C08F 18/20
[52] U.S. Cl. ................................................... 526/245
[58] Field of Search ........................................ 526/245

[56] References Cited

U.S. PATENT DOCUMENTS

| | | | |
|---|---|---|---|
| 3,238,235 | 3/1966 | Hauptschein et al. | 526/245 |
| 3,455,889 | 7/1969 | Coleman | 526/245 |
| 3,639,438 | 2/1972 | Smeltz | 526/245 |
| 4,341,685 | 7/1982 | Miyake et al. | 526/245 |

FOREIGN PATENT DOCUMENTS

| | | | |
|---|---|---|---|
| 0121140 | 10/1984 | European Pat. Off. | 526/245 |
| 2151035 | 2/1973 | Fed. Rep. of Germany | 526/245 |
| 2746416 | 4/1978 | Fed. Rep. of Germany | 526/245 |
| 58-34867 | 3/1983 | Japan | 526/245 |
| 58-113932 | 7/1983 | Japan | 526/245 |
| 59-152909 | 8/1984 | Japan | 526/245 |
| 62-507 | 1/1987 | Japan | 526/245 |

Primary Examiner—Joseph L. Schofer
Assistant Examiner—N. Sarofim
Attorney, Agent, or Firm—Larson and Taylor

[57] ABSTRACT

An α-fluoroacrylic acid polymer and a pervaporation membrane made of the polymer, the polymer comprising:

(1) about 5 to about 100% by weight of a structural unit represented by the formula

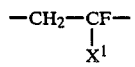

wherein $X^1$ is (i) carboxyl group optionally converted to alkali metal salt, calcium salt, magnesium salt, zinc salt, iron salt, nickel salt, mercury salt, copper salt, cadmium salt, ammonium salt or $C_1$–$C_{20}$ alkyl group-containing primary or tertiary amine salt, or (ii) a group —CONR$^4$R$^5$ (wherein R$^4$ is hydrogen or $C_1$–$C_{20}$ alkyl group and R$^5$ is hydrogen, $C_1$–$C_{20}$ hydroxyalkyl group, $C_1$–$C_{20}$ alkyl group containing sulfone group or carboxyl group both optionally converted to alkali metal salt, or a group —R$^7$NHR$^8$·HY$^2$ [wherein R$^7$ is $C_1$–$C_5$ alkylene group, R$^8$ is $C_1$–$C_{20}$ alkyl group optionally containing hydroxyl group and Y$^2$ is halogen]);

(2) 0 to about 95% by weight of a structural unit represented by the formula

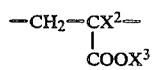

wherein $X^2$ is hydrogen, fluorine or methyl and $X^3$ is $C_1$–$C_{10}$ alkyl group or $C_2$–$C_{10}$ fluoroalkyl group (provided that the group optionally contains 1 to 3 oxygen atoms in the carbon atom chain); and (3) 0 to about 95% by weight of a structural unit represented by the formula

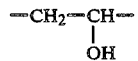

2 Claims, No Drawings

ALPHA-FLUOROACRYLIC ACID POLYMER AND ITS USE

TECHNICAL FIELD OF THE INVENTION

This invention relates to a pervaporation membrane and to an α-fluoroacrylic acid polymer of which the membrane is made.

BACKGROUND ART

The process for separating a specific component from other components in a liquid mixture of these components using a nonporous, homogeneous polymer membrane is generally called a pervaporation process and has been heretofore frequently investigated on azeotropic mixtures with the components inseparable by distillation.

Polymer membranes known to be used in a pervaporation process include those prepared from a fluoroolefin polymer containing a functional group such as sulfonic acid group or the like (e.g. those disclosed in Japanese Unexamined Patent Publication No. 33278/1979). However, these membranes have the problems of small permeation amount per unit area and thus low productivity.

SUMMARY OF THE INVENTION

It is an object of the present invention to provide a novel α-fluoroacrylic acid polymer.

It is another object of the invention to provide a pervaporation membrane capable of effectively separating a specific component from other components in a liquid mixture of these components, particularly suitable for separating water from an organic polar liquid in a mixture of these substances.

The present invention provides an α-fluoroacrylic acid polymer and a pervaporation membrane made of the polymer, the polymer comprising:

(1) about 5 to about 100% by weight of a structural unit represented by the formula

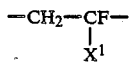   (a)

wherein $X^1$ is (i) carboxyl group optionally converted to alkali metal salt, calcium salt, magnesium salt, zinc salt, iron salt, nickel salt, mercury salt, copper salt, cadmium salt, ammonium salt or $C_1$–$C_{20}$ alkyl group-containing primary or tertiary amine salt, or (ii) a group —$CONR^4R^5$ (wherein $R^4$ is hydrogen or $C_1$–$C_{20}$ alkyl group and $R^5$ is hydrogen, $C_1$–$C_{20}$ hydroxyalkyl group, $C_1$–$C_{20}$ alkyl group containing sulfone group or carboxyl group both optionally converted to alkali metal salt, or a group —$R^7NHR^8 \cdot HY^2$ [wherein $R^7$ is $C_1$–$C_5$ alkylene group, $R^8$ is $C_1$–$C_{20}$ alkyl group optionally containing hydroxyl group and $Y^2$ is halogen]);

(2) 0 to about 95% by weight of a structural unit represented by the formula

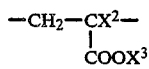   (b)

wherein $X^2$ is hydrogen, fluorine or methyl and $X^3$ is $C_1$–$C_{10}$ alkyl group or $C_2$–$C_{10}$ fluoroalkyl group (provided that the group optionally contains 1 to 3 oxygen atoms in the carbon atom chain); and (3) 0 to about 95% by weight of a structural unit represented by the formula $$-CH_2-CH- \atop | \atop OH$$   (c)

DETAILED DESCRIPTION OF THE INVENTION AND THE PREFERRED EMBODIMENTS

The above-specified amounts of the structural unit of the formula (a) and the structural unit of the formula (c) contained in the polymer result in enhanced capacity of the polymer of separating water from an organic liquid in a mixture thereof. The structural unit of the formula (b) is incorporated into the polymer to give a pervaporation membrane improved in terms of mechanical properties and flexibility.

Of the polymers of the present invention, a class of the polymer wherein $X^1$ is carboxyl group can be prepared by subjecting to radical polymerization a monomer represented by the formula

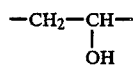

(which can be prepared, for example, by the process disclosed in Japanese Unexamined Patent Publication No. 85345/1986) and hydrolyzing the acid fluoride (-COF) of the side chain. The radical polymerization is carried out by conventional methods (as described, e.g., in Japanese Unexamined Patent Publication No. 111309/1986). The polymer wherein $X^1$ is carboxyl group optionally converted to alkali metal salt, calcium salt, magnesium salt, zinc salt, iron salt, nickel salt, mercury salt, copper salt, cadmium salt, ammonium salt or $C_1$–$C_{20}$ alkyl group-containing primary or tertiary amine salt can be prepared, for example, by reacting the hydrolysis product of the polymer (COOH of side chain) with a hydroxide of alkali metal, carbonate of alkaline earth metal, ammonia, primary or tertiary amine or the like. The polymer wherein $X^1$ is a group —$CONH_2$ can be prepared, for example, by reacting the polymer having the acid fluoride with ammonia. When the resulting reaction product is reacted with;

(i) formaldehyde
(ii) formaldehyde and sodium hydrogensulfite; or
(iii) formaldehyde amine and hydrogen halide, one of the following polymers is produced wherein $X^1$ is one of the groups represented respectively by (i') —$CONHCH_2OH$;
(ii') —$CONHCH_2SO_3Na$; or
(iii') —$CONHCH_2NHR^3 \cdot HY^2$ (wherein $R^3$ and $Y^2$ are as defined above)

The polymer wherein $X^1$ is carboxyl group can be prepared also by polymerizing a monomer represented by the formula

in place of the monomer having the acid fluoride and subjecting the ester linkage of side chain to thermal decomposition at a temperature of about 150° to about 200° C. under reduced pressure.

A monomer represented by the formula

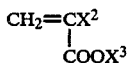

where $X^2$ and $X^3$ are as defined above and a monomer (vinyl acetate) represented by the formula

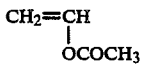

can be copolymerized with the monomer containing the acid fluoride or the like to incorporate the structural units (b) and (c) into the polymer. The structural unit (c) can be obtained by partially or wholly hydrolyzing by conventional methods the side chain of the structural unit derived from vinyl acetate after the polymerization.

Also copolymerizable with the monomers are other ethylenically unsaturated compounds which do not impair the properties of the polymer of the present invention. Examples of other ethylenically unsaturated compounds useful in the invention are styrene, vinyl chloride, acrylonitrile, hydroxyethyl acrylate, acrylic acid and the like.

The polymer of the present invention has a number-average molecular weight of about 10,000 to about 5,000,000 and an intrinsic viscosity ($\pi$) of about 0.1 to about 3.0 as determined in tetrahydrofuran at 35° C.

For use as a pervaporation membrane, the polymer of the invention can be subjected to crosslinking reaction utilizing the carboxyl group or like functional group contained in the polymer to improve the strength of the membrane. The crosslinking reaction is conducted usually using a crosslinking agent such as ethylenediamine, hexamethylenediamine, butyleneglycidyl ether, hexamethylene isocyanate trimer, tolylene diisocyanate, etc. The crosslinking agent is used in such amount that about 0.01 to about 0.30 equivalent of functional group in the crosslinking agent is used per equivalent of the functional group in the polymer. The crosslinking reaction is effected at a temperature of about 10° to about 200° C., and completed in about a few seconds to about 48 hours.

The pervaporation membrane of the present invention can be prepared by dissolving the polymer in water or methanol, ethanol or like alcohol in a concentration of about 1 to about 20% by weight and applying the solution to a smooth-surfaced panel made of glass, metal or the like or to a porous substrate of fim or hollow fiber of polypropylene, polyethylene or the like by conventional methods such as bar coater, spin coater, dipping or Langmuir method to form a membrane. When crosslinked, the membrane formed on the smooth-surfaced panel of metal or the like is used as fixed to a suitable substrate after crosslinking, or the membrane formed on the porous substrate is used as adhered thereto after crosslinking. The thickness of the membrane is usually about 1 to 200 μm.

Since the pervaporation membrane of the invention is highly pervious to water but is less pervious to polar liquids such as ethanol, iso-propanol or like alcohols, tetrahydrofuran, dioxane or like ethers or dimethylformamide or like amides, the membrane can be used for separation of water from a polar liquid in a mixture thereof.

The polymer of the invention can be used for other applications than for pervaporation membranes, e.g., ion-exchange membranes, antistatic additives, water-absorbing materials, emulsifying agents comparable in properties to poval, or the like.

EXAMPLE 1

A polymer of α-fluoro-tert-butyl acrylate having an intrinsic viscosity ($\eta$) of 1.0 dl/g as determined in tetrahydrofuran at 35° C. was heated at 165° C. for 2 hours under reduced pressure. A theoretical amount of isobutene was produced, and it was found that the side chain was substantially completely converted to carboxyl group.

The infrared absorption analysis of the polymer revealed the absorption with respect to the hydroxyl group at 2500–35000 and 1440 cm$^{-1}$ and carbonyl group at 1750 cm$^{-1}$ but the disappearance of absorption with respect to the methyl group of α-fluoro-tert-butyl acrylate polymer at 2900, 1440 and 1370 cm$^{-1}$ and quaternary carbon at 750 cm$^{-1}$.

A 2 g portion of the polymer thus obtained and 0.2 g of blocked isocyanate (product of Nippon Polyurethane Co., Ltd., trade name Coronate 2507) were dissolved in 10 g of methanol. The solution was applied to a glass panel by a bar coater and the coated panel was heated at 130° C. for 2 hours. The membrane thus formed was immersed in a 3 wt % solution of sodium hydroxide in ethanol to neutralize the carboxyl group to sodium salt. Then the membrane was washed with ethanol and dried in a vacuum, giving a membrane specimen having a thickness of 55 μm.

Using the specimen obtained above, a separation test was carried out on a mixture of water and isopropanol (in a weight ratio of 10:90) at a temperature of 40° C. and a pressure of 0.1 mmHg at the permeation side. The selectivity ($\alpha$) of water against iso-propanol was 25.0 and the permeation amount of water and isopropanol was 840 g/hr·m$^2$. The term selectivity ($\alpha$) used herein refers to the same meaning as in the art and is given by the following equation:

$$\alpha_{AB} = (A_2/B_2)/(A_1/B_1)$$

wherein $A_1$ and $B_1$ represent the weight of the component A and the component B, respectively in a mixture before passage of the mixture through the membrane, and $A_2$ and $B_2$ represent the weight of the component A and the component B, respectively in the mixture after its passage therethrough.

EXAMPLE 2

The same procedure as in Example 1 was repeated with the exception of conducting the neutralization with triethyl amine, giving a membrane specimen having a thickness of 46 μm.

The specimen thus obtained was subjected to the same separation test as in Example 1, i.e. using a mixture of the same composition under the same conditions. The selectivity ($\alpha$) of water against iso-propanol was 31.5 and the permeation amount of water and iso-propanol was 545 g/hr.m$^2$.

EXAMPLE 3

A 100 part-by-weight quantity of α-fluoroacrylic acid fluoride was dissolved in 2000 parts by weight of toluene. Through the solution was passed an ammonia gas in excess with respect to the acid fluoride. The α-fluoroacrylamide thus produced was recrystallized from acetone twice, giving a product with a melting point of 116° C. The α-fluoroacrylamide (10 parts by weight) was dissolved in 90 parts by weight of water. To the solution were added 0.01 part by weight of ammonium persulfate and 0.5 part by weight of sodium phosphate dodecahydrate. The mixture was maintained at 85° C. for 14 hours to undergo polymerization. The reaction mixture was poured into a large amount of methanol to precipitate the polymer and the mixture was dried under reduced pressure.

The infrared absorption analysis of the polymer showed the absorption with respect to the tertiary carbon at 1440 cm$^{-1}$ but the disappearance of absorption with respect to the double bond of α-fluoroacrylamide at 900 and 920 cm$^{-1}$.

A 10 wt % aqueous solution of the polymer obtained above was prepared and was cast onto a glass panel. Then the coated glass panel was heated to 200° C., giving a membrane specimen having a thickness of 46 μm.

Using the specimen thus obtained, the same separation test as in Example 1 was conducted, i.e. on a mixture of the same composition. The selectivity (α) of water against iso-propanol was 12.8 and the permeation amount of water and iso-propanol was 530 g/hr.m$^2$.

EXAMPLE 4

To a 3 wt % aqueous solution of the α-fluoroacrylamide polymer obtained in Example 3 was added formalin in an amount corresponding to an equivalent amount of amide group. The mixture was reacted at 45° C. for 90 minutes, giving an aqueous solution of reaction mixture having the structure of N-methylol-α-fluoroacrylamide polymer.

The infrared absorption analysis of the polymer showed the absorption with respect to the hydroxyl group at 3200 to 3500 cm$^{-1}$, methylene group at 1530 cm$^{-1}$ and carbonyl group at 1000 to 1050 cm$^{-1}$.

The solution was cast onto a glass panel and the coated glass panel was heated at 100° C. for 3 hours, giving a membrane specimen having a thickness of 142 μm.

Using the specimen thus obtained, the same separation test as in Example 1 was conducted, i.e. on a mixture of the same composition. The selectivity (η) of water against iso-propanol was 32.3 and the permeation amount of water and isopropanol was 240 g/hr.m$^2$.

EXAMPLE 5

A copolymer prepared from 90 mole % of a monomer represented by the formula CH$_2$=CFCOOCH$_2$CF(CF$_3$)OC$_3$F$_7$ and 10 mole % of a monomer represented by the formula CH$_2$=CFCOOCH$_2$C(CH$_3$)$_3$ was dissolved in metaxylene hexafluoride to obtain a solution in a concentration of 10% by weight. The solution was cast onto a glass panel by a bar coater. The coated panel was dried at 120° C. and heated at 165° C. for 2 hours to convert the tert-butyl group in the copolymer to carboxyl group. Thereafter the panel was immersed in a 0.05 wt % solution of potassium hydroxide in methanol for a day to convert the carboxyl group to potassium salt, whereby a membrane specimen of 67 μm thickness was formed.

Using the specimen thus obtained, the same separation test as in Example 1 was conducted, i.e. on a mixture of the same composition. The selectivity (α) of water against iso-propanol was 15.3 and the permeation amount of water and iso-propanol was 320 g/hr. m$^2$.

COMPARISON EXAMPLE

A membrane of a polymer comprising a structural unit of the formula

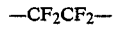
—CF$_2$CF$_2$— and a structural unit of the formula

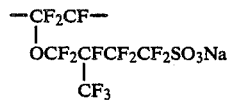

(in a ratio of the former to the latter of approximately 9:1) was immersed in a 1N aqueous solution of potassium chloride for a day, washed with deionized water and dried at 70° C. for 24 hours. Thereafter the same separation test as in Example 1 was conducted using the specimen membrane on a mixture of the same composition. The selectivity (α) of water against iso-propanol was 26.0 and the permeation amount of water and iso-propanol was 85 g/hr.m$^2$.

The pervaporation membranes prepared from the polymer of the present invention are capable of separating a specific component from other components in a liquid mixture thereof with high efficiency, particularly effectively separating water from a polar organic liquid in a mixture thereof.

We claim:
1. An α-fluoroacrylic acid polymer comprising:
   (1) about 5 to about 100% by weight of a structural unit represented by the formula

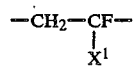

wherein X$^1$ is (i) —COOH, —COOM wherein M is an alkali metal, Ca, Mg, Zn, Fe, Ni, Hg, Cu, Cd or NH$_3$, or C$_1$–C$_{20}$ alkyl group-containing primary or tertiary amine salt, or (ii) a group —CONR$^4$R$^5$ (wherein R$^4$ is hydrogen or C$_1$–C$_{20}$ alkyl group and R$^5$ is hydrogen, C$_1$–C$_{20}$ hydroxyalkyl group, C$_1$–C$_{20}$ alkyl group containing —SO$_3$H, SO$_3$M wherein M is an alkali metal, —COOH or —COOM wherein M is an alkali metal or a group —R$^7$NHR$^8$·HY$^2$);
   (2) 0 to about 95% by weight of a structural unit represented by the formula

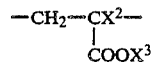

wherein X$^2$ is hydrogen, fluroine or methyl and X$^3$ is C$_1$–C$_{10}$ alkyl group which may contain 1 to 3 oxygen atoms in carbon atom chain or C$_2$–C$_{10}$ fluoralkyl group which may contain 1 to 3 oxygen atoms; and
   (3) 0 to about 95% by weight of a structural unit represented by the formula

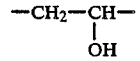

2. An α-fluoracrylic acid polymer according to claim 1 wherein X$^1$ is a group represented by the formula

—CONR$^4$R$^5$ wherein R$^4$ and R$^5$ are as defined in claim 1.

* * * * *